INVENTOR.
Willard R. Cross

Aug. 10, 1954     W. R. CROSS     2,685,900
MULCH SHREDDING AND SPREADING MACHINE
Filed Aug. 9, 1951     2 Sheets-Sheet 2
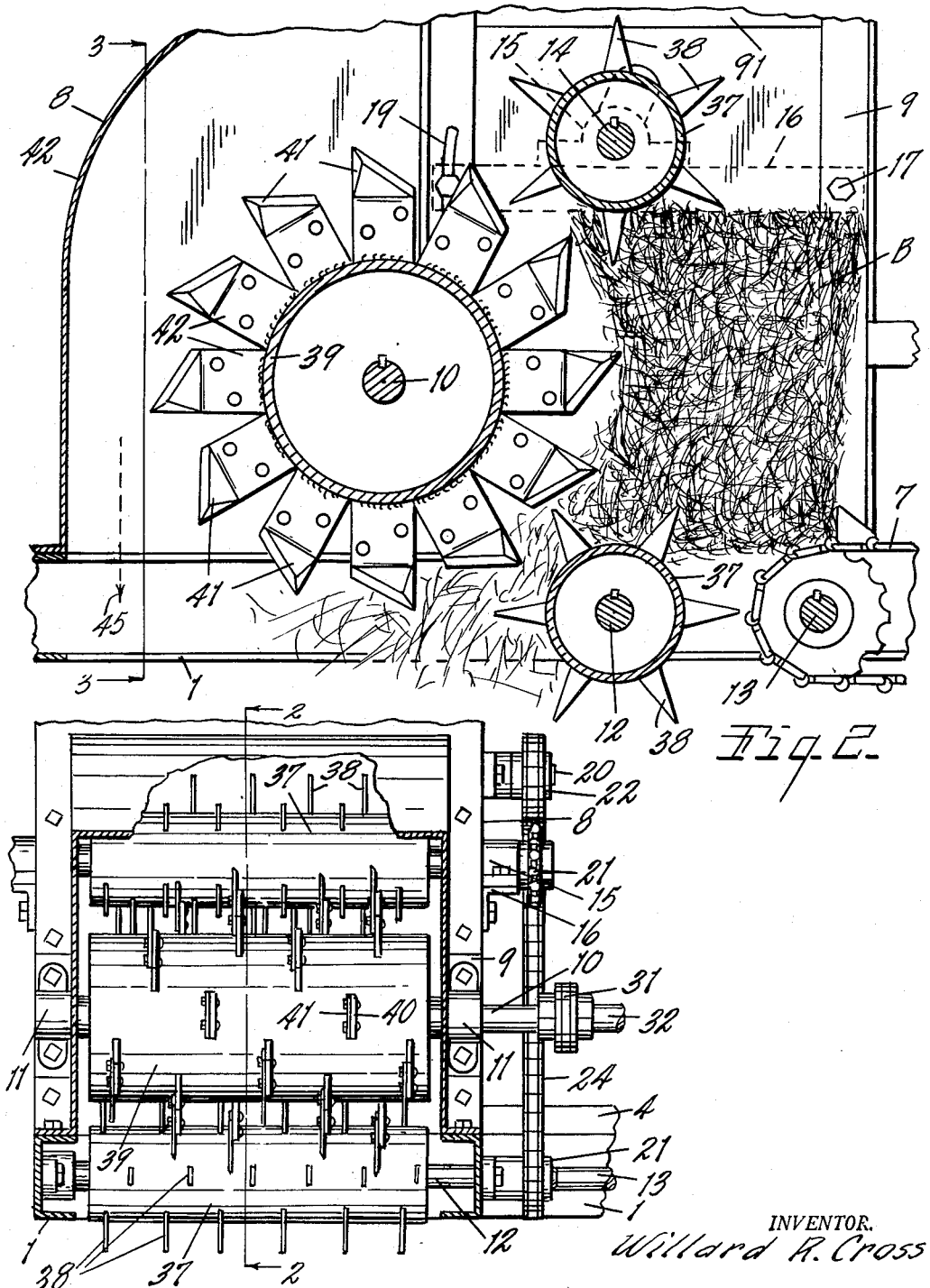
INVENTOR.
Willard R. Cross
By Otto A. Earl
Attorney.

Patented Aug. 10, 1954

2,685,900

UNITED STATES PATENT OFFICE 2,685,900

MULCH SHREDDING AND SPREADING MACHINE

Willard R. Cross, Lawrence, Mich.

Application August 9, 1951, Serial No. 241,101

9 Claims. (Cl. 146—118)

This invention relates to improvements in mulch shredding and spreading machine.

The principal objects of this invention are:

First, to provide a machine for economically and effectively shredding baled hay or straw and the like and depositing the shredded material as a mulch on low crops such as strawberries.

Second, to provide a mulch shredder which will effectively shred and separate an entire bale of the mulch material without leaving unseparated chunks as the end of the bale passes through the machine.

Third, to provide a mulch shredder and spreader that effectively deposits the mulch by air blast after the mulch material has been shredded.

Fourth, to provide a mulch spreader which is adjustable to deposit the mulching material vertically downwardly on top of the crop, or angularly to deposit a greater proportion of the mulching material underneath the leaves of the crop.

Fifth, to provide a mulch spreading machine which will continuously advance or feed a series of bales of mulching material to the shredding and spreading apparatus in timed relationship to the travel of the machine along a crop row.

Other objects and advantages of my shredder and spreader will be apparent from a consideration of the following description and claims.

The drawings, of which there are two sheets, illustrate a highly practical form of my mulcher and spreader.

Fig. 2 is a fragmentary vertical cross sectional view through the shredding and feeding rolls taken along the plane of the line 2—2 in Fig. 3.

Fig. 3 is a front elevational view of the shredding apparatus partially broken away in section along the plane of line 3—3 in Fig. 2 to illustrate the relative positions of the feeding and shredding rolls.

Figure 1:
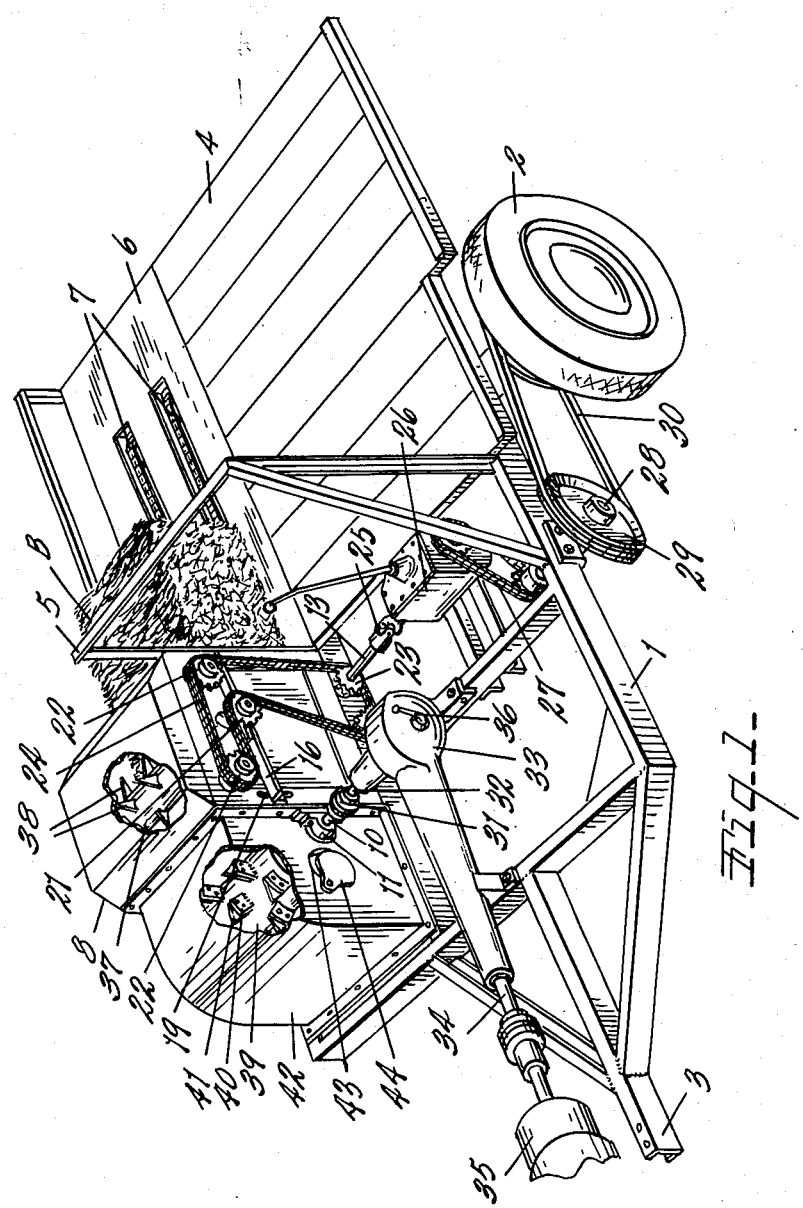
Fig. 1 is a perspective view of the mulcher and spreader with portions of the casing broken away to illustrate details of the feeding and shredding apparatus.

Many crops, particularly those having low growing plants, planted in closely spaced relationship in long rows are desirably covered with a mulch of hay or straw in order to keep down weed growth. This procedure reduces the amount of weeding required which is of considerable importance inasmuch as the crops are not susceptible to being weeded or cultivated by mechanical means. My mulch shredder and spreader can be moved along the ground over a crop row to effectively deposit the desired amount of mulching material over the crop by shredding bales of hay or straw that are carried on the machine.

Any wheeled carriage having the desired tread and ground clearance may be used as a vehicle for my mulch apparatus. In the drawings I have illustrated a flat bed trailer having a framework 1 and two ground wheels, one of which is illustrated at 2. The front end of the framework is adapted at 3 for attachment to a tractor or other prime mover. The rear end of the framework 1 is covered with a working and bale storage platform 4, and a hand rail or fence 5 is provided at the front of the platform for convenience of the operator. The right side of the platform 4 is provided with a conveyor way 6 through which two conveyor feed chains 7 project to advance bales of hay or straw forwardly to the shredding and spreading apparatus mounted on the right front corner of the framework and generally indicated at 8.

The shredding and spreading apparatus includes a rigid framework having suitable upright members 9 and horizontal connecting members 91 arranged to support four transversely extending shafts. The shredder roll shaft 10 is fixedly mounted in bearings 11 secured to the forward upright 9. A lower feed roll shaft 12 is fixedly journaled in suitable bearings in the bed framework 1. A conveyor drive shaft 13 is also fixedly journaled in the bed framework rearwardly of the lower feed roll shaft 12. An upper feed roll shaft 14 is adjustably journaled in bearings 15 mounted on beams 16 which extend along each side of the shredding apparatus. The beams 16 are pivotally supported at their rear ends to the rear uprights 9 as at 17 (see Fig. 2) and are adjustably secured to the front uprights by means of bolts passed through the slots 19. This mounting of the upper feed roll shaft 14 permits the spacing of the shafts 12 and 14 to be adjusted for handling bales of different thicknesses. Two stub shafts 20 are mounted on the left side of the shredder framework above the level of the upper feed roll shaft.

The feed roll shafts 12 and 14 are provided on their left ends with driving sprockets 21 and the stub shafts 20 carry idler sprockets 22. The conveyor drive shaft 13 carries drive sprocket 23 and a chain 24 is trained around the sprockets 21, 22, and 23 to rotate all of the shafts sumultaneously. The conveyor drive shaft 13 is extended to the left through a flexible coupling 25 to a change speed transmission 26 mounted on the bed frame 1 of the carriage. The transmission 26 is driven through a suitable system such as the chain 27, shaft 28, pulley 29, and belt 30 from one of the ground wheels 2. It will thus be seen that the conveyor chains 7 and feed roll shafts 12 and 14 will be operated in adjustable timed relationship to the speed of the carriage over the ground.

The shredder drive shaft 10 is provided on its left end with a flexible coupling 31 to a driving shaft 32. The shaft 32 may be driven in any suitable manner. In the example illustrated the shaft 31 extends from a reversing gear housing 32 having a forwardly extending shaft 34 adapted to be coupled to the power take-off 35 of a towing tractor. A lever for shifting the gearing in housing 33 to reverse the rotation of the shaft 32 is illustrated at 36. An obvious alternative driving mechanism would be to mount an auxiliary motor on the carriage frame 1 and connect it to the shaft 10.

As is best illustrated in Figs. 2 and 3 the feed roll shafts 12 and 14 carry and drive identical upper and lower feed rolls 37 which have a series of pointed teeth 38 projecting from the surfaces thereof for a substantial distance. The teeth 38 are adapted to penetrate into the upper and lower sides of a bale B of hay or straw as it is advanced to the feed rolls by the conveyor chains 7. It should be particularly noted that the feed rolls are adjustable to engage the upper and lower surfaces of the bale and clamp it therebetween while the teeth 38 advance the bale. The shredder roll shaft 10 carries a strong rigid shredder roll 39 which is substantially larger than the feed rolls 37. The periphery of the shredder roll 39 has a series of radially extending plates 40 welded thereto at spirally staggered positions around the roll. The plates 40 are disposed in planes normal to the axis of the roll so as to be translated edgewise by rotation of the roll. Each of the plates 40 has bolted to its outer end a sharpened cutting blade 41. The blades 41 are pointed and double edge as illustrated, and it will be noted that the outer ends of the blades are swung through an arc to the plane between the feed roll shafts 12 and 14.

Suitable enclosing panels 42 are provided for the top and sides of the framework 9 so as to enclose the feed rolls 37 and shredder roll 39. The rear end of the framework is of course open to receive the incoming bales, but it should be noted that the bale itself forms a partial closure for the rear of the housing formed by the panels 42. The bottom of the housing is open underneath the shredder roll 39 and desirably an air opening 43 provided with an adjustable damper 44 is provided in the side of the housing near the axis of the shredder roll 39.

The driving connections to the shredder roll 39 are designed in connection with the driving means so as to drive the roll at between 1,000 and 2,000 R. P. M. At this speed the radially projecting plates and knife blades 41 will act as impelling vanes of a centrifugal blower so that not only will the shredded mulch material be thrown downwardly by mechanical action of the blades, but the material will be blown into and around the crop with considerable force. The central opening 43 permits air to enter the housing formed by the plates 42 and be pumped outwardly of the housing as in a centrifugal blower. It should be noted that with the shredder roll rotating rearwardly or clockwise as shown in Fig. 2 the air blast and shredded material will tend to leave the bottom of the housing at a forwardly inclined angle. However, when the rotation of the shredder roll 39 is reversed the shredded material will be thrown more perpendicularly downwardly onto the top of the crop as is indicated by the dotted arrow at 45.

Having thus described the invention what is claimed as new and desired to secure by Letters Patent is:

1. A mulch shredding and spreading machine comprising a wheeled carriage having a platform, a closed housing on said platform opening at one end and through the bottom of said carriage, a feed conveyor on said platform adapted to feed bales into said one end of said housing and longitudinally of said carriage, feed rolls horizontally disposed in vertically spaced relationship within said housing to grip bales therebetween from said conveyor, said feed rolls having elongated bale penetrating teeth projecting from their surfaces, a shredder roll rotatively mounted within said housing parallel to said feed rolls and on the opposite side thereof from said conveyor, a plurality of plates projecting from said shredder roll at axially and angularly spaced positions therearound and in planes normal to the axis of the shredder roll, double edged pointed shredding knives secured to said plates and projecting radially therefrom approximately to the plane of the axes of said feed rolls and swingable by said shredder roll between said feed rolls, said teeth and said blades projecting into overlapping relation when opposed, means for selectively driving said shredder roll in either direction at between 1,000 and 2,000 R. P. M., means for driving said conveyor and said feed rolls concurrently in timed relationship to the speed of said carriage, means for varying the spacing between said feed rolls, a wall of said housing having an opening formed therein adjacent the axis of said shredder roll, and a shutter for adjusting the effective size of said last opening.

2. A mulch shredding and spreading machine comprising a wheeled carriage having a platform, a closed housing on said platform opening at one end and through the bottom of said carriage, a feed conveyor on said platform adapted to feed bales into said one end of said housing, feed rolls horizontally disposed in vertically spaced relationship within said housing to grip bales therebetween from said conveyor, said feed rolls having elongated bale penetrating teeth projecting from their surfaces, a shredder roll rotatively mounted within said housing parallel to said feed rolls and on the opposite side thereof from said conveyor, a plurality of plates projecting from said shredder roll at axially and angularly spaced positions therearound and in planes normal to the axis of the shredder roll, doubled edged shredding knives secured to said plates and projecting radially therefrom approximately to the plane of the axes of said feed rolls and swingable by said shredder roll between said feed rolls, means for selectively driving said shredder roll in either direction at between 1,000 and 2,000 R. P. M., means for driving said conveyor and said feed rolls concurrently in timed relationship to the speed of said carriage, means for varying the spacing between said feed rolls, a wall of said housing having an opening formed therein adjacent the axis of said shredder roll, and a shutter for adjusting the effective size of said last opening.

3. A mulch shredding and spreading machine comprising a wheeled carriage having a platform, a closed housing on said platform opening at one end and through the bottom of said carriage, a feed conveyor on said platform adapted to feed bales into said one end of said housing, feed rolls horizontally disposed in vertically spaced relationship within said housing to grip bales therebetween from said conveyor, said feed rolls having elongated bale penetrating teeth projecting from their surfaces, a shredder roll rotatively mounted within said housing parallel to said feed rolls and on the opposite side thereof from said conveyor, a plurality of plates projecting from said shredder roll at axially and angularly spaced positions therearound and in planes normal to the axis of the shredder roll, double-edged pointed shredding knives secured to said plates and projecting radially therefrom approximately to the plane of the axes of said feed rolls and swingable by said shredder roll between said feed rolls, means for driving said shredder roll in excess of 1,000 R. P. M., means for driving said conveyor and said feed rolls concurrently in timed relationship to the speed of said carriage, and means for varying the spacing between said rolls.

4. A mulch shredding and spreading machine comprising a wheeled carriage having a platform, a closed housing on said platform opening at one end and through the bottom of said carriage, a feed conveyor on said platform adapted to feed bales into said one end of said housing, feed rolls horizontally disposed in vertically spaced relationship within said housing to grip bales therebetween from said conveyor, a shredder roll rotatively mounted within said housing parallel to said feed rolls and on the opposite side thereof from said conveyor, a plurality of plates projecting from said shredder roll at axially and angularly spaced positions therearound, shredding knives secured to said plates and projecting radially therefrom approximately to the plane of the axes of said feed rolls and swingable by said shredder roll between said feed rolls, means for driving said shredder roll in excess of 1,000 R. P. M., and means for driving said conveyor and said feed rolls concurrently in timed relationship to the speed of said carriage.

5. A mulch shredding and spreading machine comprising a wheeled carriage having a platform, a closed housing on said platform opening at one end and through the bottom of said carriage, feed rolls disposed horizontally in vertically spaced relationship within said housing to receive bales therebetween from said one end, said feed rolls having elongated bale penetrating teeth projecting from their surfaces, a shredder roll rotatively mounted within said housing parallel to said feed rolls and on the opposite side thereof from said one end, a plurality of shredding knives secured to said shredder roll and projecting radially therefrom approximately to the plane of the axes of said feed rolls and swingable by said shredder roll between said feed rolls, means for driving said shredder roll in excess of 1,000 R. P. M., means for driving said feed rolls in timed relationship to the speed of said carriage to feed bales to said shredder roll, and means for varying the spacing between said rolls.

6. A mulch shredding and spreading machine comprising a wheeled carriage having a platform, a closed housing on said platform opening at one end and through the bottom of said carriage, feed rolls disposed horizontally in vertically spaced relationship within said housing to receive bales therebetween from said one end, a shredder roll rotatively mounted within said housing parallel to said feed rolls and on the opposite side thereof from said one end, a plurality of shredding knives secured to said shredder roll and projecting radially therefrom approximately to the plane of the axes of said feed rolls and swingable by said shredder roll between said feed rolls, means for driving said shredder roll in excess of 1,000 R. P. M., and means for driving said feed rolls to feed bales to said shredder roll.

7. A mulch shredding and spreading machine comprising, a horizontally disposed shredder roll having a plurality of knives projecting therefrom in axially and angularly spaced positions along its surface, means for rotating said shredder roll in excess of 1,000 R. P. M., a pair of feed rolls disposed in spaced parallel relationship and parallel to said shredder roll, said feed rolls being arranged to grip a bale of mulching material therebetween and advance it to said knives, said knives extending on one side of said shredder roll to approximately the plane of the axes of said feeder rolls, a housing enclosing the top and three sides of said rolls and being open at the bottom and one end whereby shredded material is discharged by said knives through said bottom and whereby bales may be advanced to said feeder rolls with the bale substantially closing said one end and part of the bottom of said housing, means for rotating said feeder rolls, said housing having an opening formed therein adjacent the axis of said shredder roll, and a shutter for adjustably closing said last opening.

8. A mulch shredding and spreading machine comprising, a horizontally disposed shredder roll having a plurality of knives projecting therefrom in axially and angularly spaced positions along its surface, means for rotating said shredder roll in excess of 1,000 R. P. M., a pair of feed rolls disposed in spaced parallel relationship and parallel to said shredder roll, said feed rolls being arranged to grip a bale of mulching material therebetween and advance it to said knives, said knives extending on one side of said shredder roll to approximately the plane of the axes of said feeder rolls, a housing enclosing the top and three sides of said rolls and being open at the bottom and one end whereby shredded material is discharged by said knives through said bottom and whereby bales may be advanced to said feeder rolls with the bale substantially closing said one end and part of the bottom of said housing, and means for rotating said feeder rolls.

9. A mulch shredding and spreading machine comprising, a horizontally disposed shredder roll having a plurality of knives projecting therefrom in axially spaced positions along its surface, means for rotating said shredder roll in excess of 1,000 R. P. M., a pair of feed rolls disposed in spaced parallel relationship adjacent to said shredder roll, said feed rolls being arranged to grip a bale of mulching material therebetween and advance it to said knives, said knives extending on one side of said shredder roll to approximately the plane of the axes of said feeder rolls, a housing enclosing the top and three sides of said rolls and being open at the bottom and one end whereby shredded material is discharged by said knives through said bottom and whereby bales may be advanced to said feeder rolls with the bale substantially closing said one end of said housing, and means for rotating said feeder rolls.

References Cited in the file of this patent

UNITED STATES PATENTS

| Number | Name | Date |
| --- | --- | --- |
| 563,006 | Barnes | June 30, 1896 |
| 608,014 | Thom | July 26, 1898 |
| 648,151 | Leslie | Apr. 24, 1900 |
| 692,601 | Berger | Feb. 4, 1902 |
| 886,223 | Krase et al. | Apr. 28, 1908 |
| 1,530,095 | Sharp | Mar. 17, 1925 |
| 2,105,805 | Challis | Jan. 18, 1938 |
| 2,561,069 | Peterson | July 17, 1951 |
| 2,626,159 | Thompson | Jan. 20, 1953 |

FOREIGN PATENTS

| Number | Country | Date |
| --- | --- | --- |
| 455,290 | Germany | Jan. 28, 1928 |